United States Patent
Keijer et al.

(10) Patent No.: US 12,295,480 B2
(45) Date of Patent: May 13, 2025

(54) APPARATUS AND METHOD FOR OPTIMIZED HAIRSTYLE GUIDE GENERATION

(71) Applicant: KONINKLIJKE PHILIPS N.V., Eindhoven (NL)

(72) Inventors: Jeroen Keijer, Groningen (NL); Cornelis Johannes Zandsteeg, Usselmuiden (NL); Shaik Khader Basha, Bangalore (IN); Roderik De Vries, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 650 days.

(21) Appl. No.: 17/053,813

(22) PCT Filed: May 1, 2019

(86) PCT No.: PCT/EP2019/061167
§ 371 (c)(1),
(2) Date: Nov. 9, 2020

(87) PCT Pub. No.: WO2019/228739
PCT Pub. Date: Dec. 5, 2019

(65) Prior Publication Data
US 2021/0227953 A1    Jul. 29, 2021

(30) Foreign Application Priority Data
May 30, 2018   (EP) ..................... 18175186

(51) Int. Cl.
A45D 44/00 (2006.01)
A45D 7/00 (2006.01)
(Continued)

(52) U.S. Cl.
CPC ............. *A45D 44/005* (2013.01); *A45D 7/00* (2013.01); *B26B 19/388* (2013.01); *G06F 3/04847* (2013.01); *A45D 2007/007* (2013.01)

(58) Field of Classification Search
CPC .. A45D 44/005; A45D 7/00; A45D 2007/007; A45D 24/00; A45D 44/00; B26B 19/388; G06F 3/04847
(Continued)

(56) References Cited

U.S. PATENT DOCUMENTS 3,570,500 A * 3/1971 Berry ...................... B26B 19/00
                                                132/213
8,928,747 B2 * 1/2015 Burdoucci ............ B26B 19/388
                                                348/61
(Continued)

FOREIGN PATENT DOCUMENTS

FR    2964023    3/2012
WO    2013011380    1/2013
(Continued)

OTHER PUBLICATIONS

International Search Report and Written Opinion Dated Jul. 9, 2019 for International Application No. PCT/EP2019/061167 Filed May 1, 2019.

*Primary Examiner* — Robert P Bullington
*Assistant Examiner* — Stephen Alvesteffer

(57) ABSTRACT

There is provided a computer-implemented method for generating an optimized hairstyle guide for use with a hair clipper. The method comprises acquiring (202) a plurality of reference points for mapping a hairstyle onto the head of a subject, receiving (204) a first user input for adjusting at least one of the relative position and the hair length value of a selected reference point, adjusting (206), based on the first user input and one or more predetermined rules, at least one of the relative position and the hair length value of one or (Continued)

more non-selected reference points, and generating (208) an optimized hairstyle guide for mapping the hairstyle.

20 Claims, 4 Drawing Sheets

(51) Int. Cl.
B26B 19/38 (2006.01)
G06F 3/04847 (2022.01)
(58) Field of Classification Search
USPC .......................................................... 434/94
See application file for complete search history.

(56) References Cited

U.S. PATENT DOCUMENTS

| | | | | |
|---|---|---|---|---|
| 10,596,716 | B2* | 3/2020 | Hoexum | B26B 19/388 |
| 10,933,546 | B2* | 3/2021 | Lauritsen | A45D 24/36 |
| 2010/0169055 | A1* | 7/2010 | Kobeck | G09B 19/003 |
| | | | | 703/1 |
| 2011/0018985 | A1* | 1/2011 | Zhu | A45D 44/00 |
| | | | | 348/61 |
| 2013/0021460 | A1* | 1/2013 | Burdoucci | B26B 19/388 |
| | | | | 382/103 |
| 2014/0182138 | A1 | 7/2014 | Krenik | |
| 2014/0200734 | A1 | 7/2014 | Krenik | |
| 2015/0197016 | A1* | 7/2015 | Krenik | B26B 21/4081 |
| | | | | 83/13 |
| 2015/0217465 | A1* | 8/2015 | Krenik | B26B 19/388 |
| | | | | 700/90 |
| 2016/0263755 | A1* | 9/2016 | Uit De Bulten | B26B 21/4081 |
| 2018/0144548 | A1* | 5/2018 | Kline | G06F 3/0304 |
| 2019/0232510 | A1* | 8/2019 | Zandsteeg | G01D 5/20 |
| 2019/0299437 | A1* | 10/2019 | Fuellgrabe | B26B 19/48 |
| 2020/0001483 | A1* | 1/2020 | Woffindin | B26B 21/4081 |

FOREIGN PATENT DOCUMENTS

| | | |
|---|---|---|
| WO | 2013096572 | 6/2013 |
| WO | 2015/067498 | 5/2015 |
| WO | 2015/068068 | 5/2015 |
| WO | 2015063651 | 5/2015 |
| WO | 2017/148941 | 9/2017 |

* cited by examiner ial Application No. ...

APPARATUS AND METHOD FOR OPTIMIZED HAIRSTYLE GUIDE GENERATION

CROSS REFERENCE TO RELATED APPLICATIONS

This application is the U.S. National Phase application under 35 U.S.C. § 371 of International Application No. PCT/EP2019/061167 filed May 1, 2019, which claims the benefit of European Patent Application Number 18175186.8 filed May 30, 2018. These applications are hereby incorporated by reference herein.

FIELD OF THE INVENTION

The present disclosure relates to an apparatus and method for generating an optimized hairstyle guide. In particular, the present disclosure relates to an apparatus and method for generating an optimized hairstyle guide for use with a hair clipper.

BACKGROUND OF THE INVENTION

There are currently applications available in the field of automatic hair clipping systems which involves the use of a position measurement system, a hair clipper with motorized length settings, a digital representation of a hairstyle, and a digital user interface which allows a user to select, create, and transfer a hairstyle to the hair clipper. Typically, a three-dimensional (3D) position and orientation measurement system can be used for such applications. These 3D systems are based on the use of alternative current (AC) magnetic fields, and they are capable of performing measurements without having the object in view of contacting the object. Nevertheless, these 3D systems require proper calibration to provide accurate measurement data.

With such applications, a user can select one of a number of different hairstyles displayed as templates at the digital user interface. Each of these selectable hairstyles can correspond to a hairstyle guide for providing instructions to a hair clipper for performing the necessary maneuvers to achieve the desired hairstyle. Since there are typically a limited number of hairstyles available for user selection, it is desirable to provide the users with an option to make minor changes to a selected hairstyle according to their wants and needs. In other words, a user may select one of the available hairstyles as a starting point, and achieve a more tailored hairstyle by making adjustments to the length and/or shape of the hairstyle at specific area(s). As an example, the user may wish to adjust the parameters only at the sides of the head, based on the default values for the selected hairstyle. However, in many cases, even when the user has an option to perform adjustments at specific area(s) of the hairstyle, they may not necessarily have a sufficient understanding or a clear perception of how the rest of the hairstyle should also be adapted so as to ensure that the end result is a reasonable and decent hairstyle.

SUMMARY OF THE INVENTION

As noted above, there are a number of disadvantages associated with the currently available techniques in the field of automatic hair clipping systems. For example, even though users may be able to make further adjustments to a selected hairstyle, these currently known applications do not take into account the fact that some users do not have the necessary awareness to make secondary adjustments to the rest of the hairstyle after changing the parameters for specific areas of the hairstyle. It would therefore be advantageous to simplify the process of creating a tailored hairstyle for the user by providing an improved method for generating an optimized hairstyle guide for use with a hair clipper.

To better address one or more of the concerns mentioned earlier, in a first aspect, there is provided a computer-implemented method for generating an optimized hairstyle guide for use with a hair clipper. The method comprises: acquiring a plurality of reference points for mapping a hairstyle onto the head of a subject, wherein each of the plurality of reference points is associated with a respective position relative to the head of the subject and a hair length value; receiving a first user input for adjusting at least one of the relative position and the hair length value of a selected reference point; adjusting, based on the first user input and one or more predetermined rules, at least one of the relative position and the hair length value of one or more non-selected reference points; and generating an optimized hairstyle guide for mapping the hairstyle, wherein the optimized hairstyle guide comprises the adjusted reference points.

In some embodiments, the one or more predetermined rules may define a value or a range of values associated with at least one of a gradient of hair length at a portion of the head of the subject.

In some embodiments, acquiring the plurality of reference points may comprise acquiring an initial hairstyle guide for mapping the hairstyle, the initial hairstyle guide comprising a plurality of principal reference points, and generating the plurality of reference points based on at least one of the plurality of principal reference points. In these embodiments, each of the plurality of principal reference points may be associated with a respective principal position relative to the head of the subject and a hair length value. Moreover, in these embodiments, the one or more predetermined rules may be associated with the initial hairstyle guide.

In some embodiments, the plurality of principal reference points may be associated with a position relative to the head of the subject at which the hair length in the mapped hairstyle is the longest.

In some embodiments, each of the plurality of principal reference points may be associated with one of: a top portion of the head of the subject, a crown portion of the head of the subject, and a neck portion of the head of the subject.

In some embodiments, adjusting at least one of the relative position and the hair length value of one or more non-selected reference points may comprise adjusting at least one of the relative position and the hair length value of one or more non-selected reference points that are within a predetermined distance from the selected reference point.

In some embodiments, the method may further comprise receiving a second user input to adjust at least one of the relative position and the hair length value of one of the plurality of principal reference points; and adjusting, based on the second user input, at least one of the relative position and the hair length value of one or more of the plurality of reference points.

In some embodiments, the generated optimized hairstyle guide may further comprise one or more non-adjusted reference points.

In some embodiments, each of the plurality of reference points may be associated with one of a plurality of longitudinal sections of the head of the subject. In these embodiments, for each of the plurality of reference points, the relative position may be defined with respect to the neck of the subject and with respect to its associated longitudinal section.

In some embodiments, adjusting at least one of the relative position and the hair length value of one or more non-selected reference points may comprise: adjusting at least one of the relative position and the hair length value of one or more non-selected reference points that are associated with the same longitudinal section as the selected reference point.

In some embodiments, the method may further comprise controlling a display to output a visual representation of the hairstyle mapped by the generated optimized hairstyle guide.

In some embodiments, the method may further comprise: detecting a relative position of the hair clipper to the hair of the subject; determining one or more reference points that are adjacent to the detected relative position of the hair clipper; calculating, for each of the determined one or more adjacent reference points, the distance between the relative position of the hair clipper and the adjacent reference point; and determining a length setting for the hair clipper based on the calculated distance between the relative position of the hair clipper and each of the one or more adjacent reference points.

In a second aspect, there is provided a computer program product comprising a computer readable medium. The computer readable medium may have computer readable code embodied therein, the computer readable code being configured such that, on execution by a suitable computer or processor, the computer or processor is caused to perform the method as described herein.

In a third aspect, there is provided an apparatus for generating an optimized hairstyle guide for use with a hair clipper. The apparatus comprises a processor configured to: acquire a plurality of reference points for mapping a hairstyle onto a head of a subject, wherein each of the plurality of reference points is associated with a respective position relative to the ad of the subject and a hair length value; receive a first user input for adjusting at least one of the relative position and the hair length value of a selected reference point; adjust, based on the first user input, the relative position and the hair length value of one or more non-selected reference points; and generate, based on one or more predetermined rules, an optimized hairstyle guide for mapping the hairstyle, wherein the optimized hairstyle guide comprises the adjusted reference points.

According to the aspects and embodiments described above, the limitations of existing techniques are addressed. In particular, the above-described aspects and embodiments enable an optimized hairstyle guide to be generated that considers any additional modifications required on the basis of adjustments made by a user to a mapped hairstyle. Specifically, the method comprises adjusting one or more reference points based on a user input and one or more predetermined rules. In this way, a reasonable resulting hairstyle can be achieved without requiring any comprehensive hairstyle knowledge from the users. There is thus provided an improved method and apparatus for generating an optimized hairstyle guide.

These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF THE EMBODIMENTS

As noted above, there is provided an improved apparatus and a method for generating an optimized hairstyle guide, which addresses the existing problems.

Figure 1:
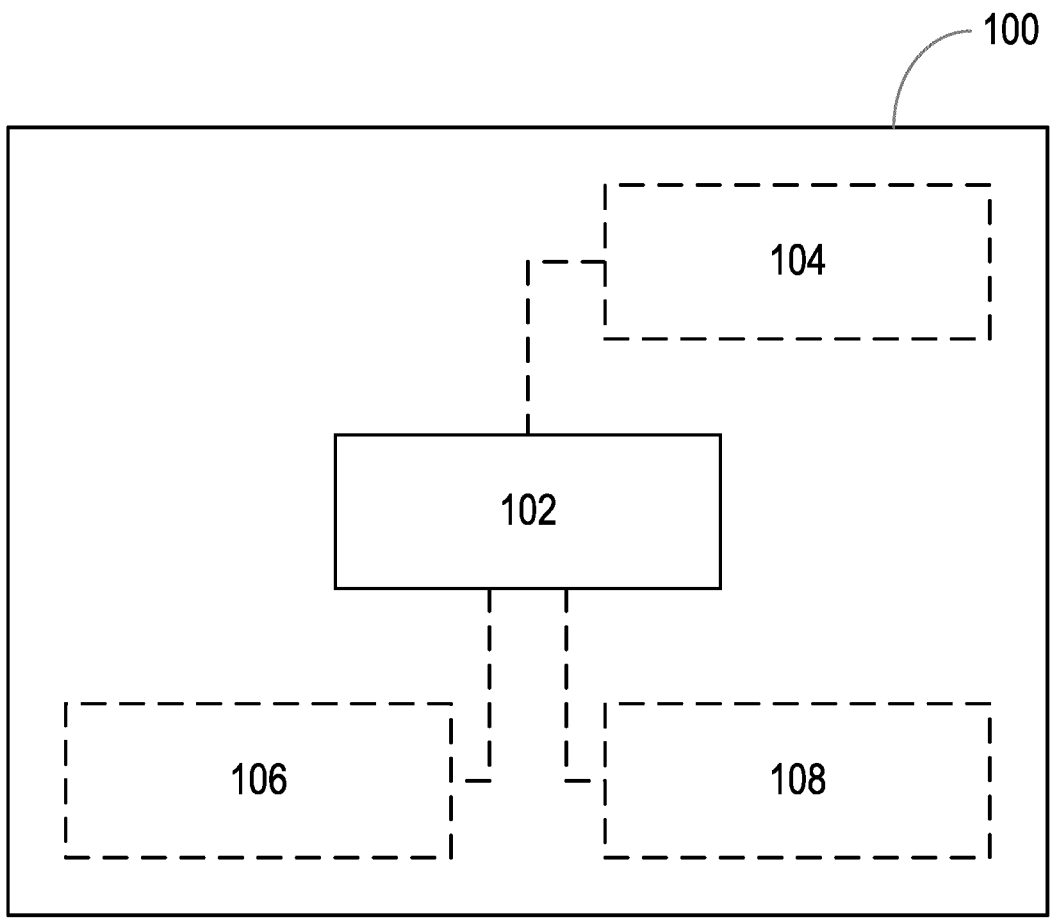
FIG. 1 is a block diagram of an apparatus for generating an optimized hairstyle guide according to an embodiment.

FIG. 1 shows a block diagram of an apparatus 100 according to an embodiment, which can be used for generating an optimized hairstyle guide for use with a hair clipper, such as a hair clipper with motorized length settings. A hairstyle guide may comprise a plurality of reference points or principal reference points which map a hairstyle, and they can be used for providing instructions to a hair clipper for performing hair clipping function. Specifically, the plurality of reference points or principal reference points can provide guidance on a length setting of the hair clipper during a hair clipping process. A hairstyle guide can represent a specific hairstyle, such as "buzz cut", "crew cut", "flattop", etc.

As illustrated in FIG. 1, the apparatus comprises a processor 102 that controls the operation of the apparatus 100 and that can implement the method described herein. The processor 102 can comprise one or more processors, processing units, multi-core processor or modules that are configured or programmed to control the apparatus 100 in the manner described herein. In particular implementations, the processor 102 can comprise a plurality of software and/or hard ware modules that are each configured to perform, or are for performing, individual or multiple steps of the method described herein.

Briefly, the processor 102 is configured to acquire a plurality of reference points for mapping a hairstyle onto the head of subject. Each of the plurality of reference points is associated with a respective position relative to the head of the subject and a hair length value. The processor 102 is then configured to receive a first user input for adjusting at least one of the relative position and the hair length value of a selected reference point, and subsequently adjust, based on the first user input and one or more predetermined rules, at least one of the relative position and the hair length value of one or more non-selected reference points. The processor 102 is also configured to generate an optimized hairstyle guide for mapping the hairstyle. The optimized hairstyle guide comprises the adjusted reference points.

In some embodiments, the apparatus 100 may further comprise at least one user interface 104. Alternatively or in addition, at least one user interface 104 may be external to (i.e. separate to or remote from) the apparatus 100. For example, at least one user interface 104 may be part of another device. A user interface 104 may be for use in providing a user of the apparatus 100 with information resulting from the method described herein. For example, the processor 102 may be configured to control one or more user interfaces 104 to render (or output or display) the generated optimized hairstyle guide in a visual representation format at a display. Alternatively or in addition, a user interface 104 may be configured to receive a user input. For example, a user interface 104 may allow a user of the apparatus 100 to manually enter instructions, data, or information. In these embodiments, the processor 102 may be configured to receive the user input from one or more user interfaces 104.

A user interface 104 may be any user interface that enables the rendering (or output or display) of information to a user of the apparatus 100. Alternatively or in addition, a user interface 104 may be any user interface that enables a user of the apparatus 100 to provide a user input, interact with and/or control the apparatus 100. For example, the user interface 104 may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, the apparatus 100 may comprise a memory 106. Alternatively or in addition, one or more memories 106 may be external to (i.e. separate to or remote from) the apparatus 100. For example, one or more memories 106 may be part of another device. A memory 106 can be configured to store program code that can be executed by the processor 102 to perform the method described herein. A memory can be used to store information, data, signals and measurements acquired or made by the processor 102 of the apparatus 100. For example, a memory 106 may be used to store (for example, in a local file) a plurality of reference points for mapping one or more hairstyles. The processor 102 may be configured to control a memory 106 to store the plurality of reference points.

In some embodiments, the apparatus 100 may comprise a communications interface (or circuitry) 108 for enabling the apparatus 100 to communication with any interfaces, memories and/or devices that are internal or external to the apparatus 100. The communications interface 108 may communicate with any interfaces, memories and/or devices wirelessly or via a wired connection. For example, the communications interface 108 may communication with one or more user interfaces 104 wirelessly or via a wired connection. Similarly, the communications interface 108 may communicate with the one or more memories 106 wirelessly or via wired connection.

It will be appreciated that FIG. 1 only shows the components required to illustrate an aspect of the apparatus 100, and in a practical implementation, the apparatus 100 may comprise alternative or additional components to those shown.

Figure 2:
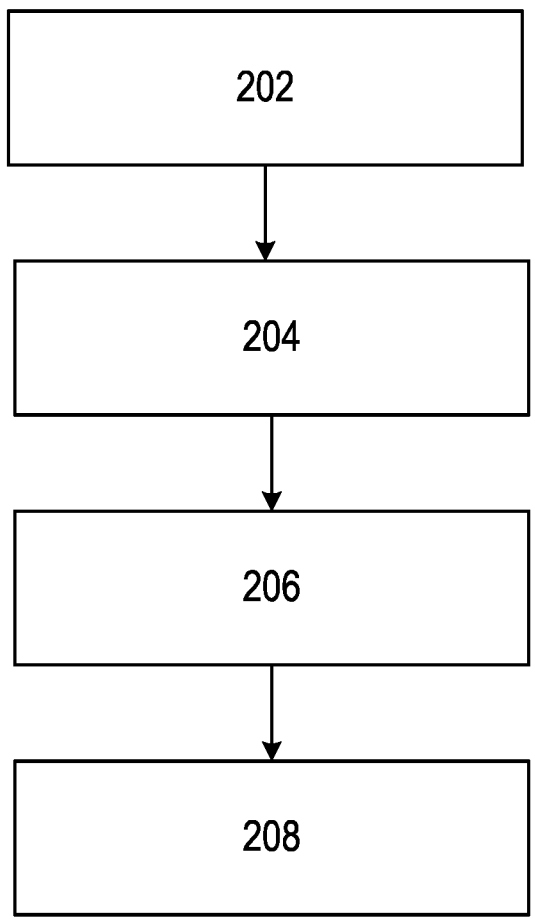
FIG. 2 illustrates a method for generating an optimized hairstyle guide according to an embodiment.

FIG. 2 illustrates a computer-implemented method for generating an optimized hairstyle guide for user with a hair clipper, according to an embodiment. In particular, the computer-implemented method as illustrated in FIG. 2 may be for generating an optimized hairstyle guide for use with a hair clipper which is provided with positioning/orientation measurement functionalities. The illustrated method can generally be performed by or under the control of the processor 102 of the apparatus 100.

With reference to FIG. 2, at block 202, a plurality of reference points for mapping a hairstyle onto the head of a subject is acquired. More specifically, the plurality of reference points for mapping the hairstyle onto the head of the subject may be acquired by the processor 102 of the apparatus 100. In some embodiments, the plurality of reference points may be acquired from one or more databases in a memory 106, which may be a memory of the apparatus 100 or a memory external to the apparatus 100.

Each of the plurality of reference points is associated with a respective position relative to the head of the subject and a hair length value. A hair length value of a reference point represents a desired hair length at the respective position relative to the head of the subject of the reference point in the mapped hairstyle. Therefore, the plurality of reference points may be provided to the hair clipper as operational instructions. Specifically, in some cases, once the relative position of the hair clipper to the head of the subject is determined, the length setting of the hair clipper can be adjusted to correspond to the hair length value of the particular reference point which is associated with a relative position corresponding to the determined relative position of the hair clipper. For example, if the hair length value of the reference point is 5 mm, the length setting of the hair clipper may be adjusted to 5 mm such that the hair of the subject can be clipped to the desired length in accordance with the respective reference point. In some embodiments, a respective position relative to the head of the subject of a reference point may be defined in a two-dimensional space (e.g. using a Cartesian or Polar coordinate system) or in a three-dimensional space (e.g. using a Cartesian coordinates or Spherical coordinate system). In some embodiments, for example, where a Spherical coordinate system is used for defining a respective position relative to the head of the subject of a reference point, two out of three Spherical coordinates may be used to relate the position of the hair clipper to head of the subject.

In some embodiments, the processor 102 may be configured to acquire an initial hairstyle guide for mapping the hairstyle. The initial hairstyle guide may comprise a plurality of principal reference points, each of the principal reference points being associated with a respective principal position relative to the head of the subject and a hair length value. A respective principal position relative to the head of the subject may be one of: a top portion of the head of the subject, a crown portion of the head of the subject, and a neck portion of the head of the subject. Moreover, the plurality of principal reference points may be associated with a positon relative to the head of the subject at which the hair length in the mapped hairstyle is the longest. It will be appreciated that other portions of the head of the subject may be used as a respective principal position in alternative embodiments.

In the embodiments where an initial hairstyle guide is acquired, at block 202 the processor 102 may be configured to acquire the plurality of reference points by generating the plurality of reference points based on at least one of the plurality of principal reference points.

In some of these embodiments, the generation of the plurality of reference points may be based on one or more predetermined rules associated with the initial hairstyle guide. The one or more predetermined rules may define a value or a range of values associated with at least one of a gradient of hair length at a portion of the head of the subject. Also, the one or more predetermined rules may be to perform (linear or non-linear) interpolation or extrapolation of at least one of the plurality of principal reference points. Alternatively or in addition, the one or more predetermined rules may be to perform other type(s) of mathematical operation on one or more of the plurality of principal reference points.

Moreover, in some of these embodiments, generating the plurality of reference points based on at least one of the plurality of principal reference points may comprise assigning at least one of the principal reference points as a reference point while retaining the relative position and the hair length value associated with the (original) principal reference point. Hence, in these specific embodiments one or more of the original principal reference points may be used as a reference point in the subsequent steps of the computer-implemented method.

In some embodiments, each of the plurality of reference points may be associated with one of a plurality of longitudinal sections of the head of the subject. In these embodiments, for each of the plurality of reference points, the relative position may be defined with respect to the neck of the subject and with respect to its associated longitudinal section. Alternatively or in addition, in some embodiments, for each of the plurality of reference points, the relative position may be defined with respect to the nasal point (i.e. a point between the eyes) of the subject. It will be appreciated that other locations at or adjacent to the head of the subject may be used as a reference for the purpose of defining the relative position of each of the plurality of reference points.

As mentioned above, in some embodiments acquiring the plurality of reference points may comprise acquiring an initial hairstyle guide comprising a plurality of principal reference points and generating the plurality of reference points based on at least one of the plurality of principal reference point. In these embodiments, each of the plurality of principal reference points may be associated with one of a plurality of longitudinal sections of the head of the subject. Therefore, in these embodiments, the generation of the plurality of reference points may comprise generating, for each of the plurality of longitudinal sections of the head of the subject, one or more reference points based on the principal reference point associated with the longitudinal section of the head of the subject.

Returning back to FIG. 2, at block 204, a first user input for adjusting at least one of the relative position and the hair length value of a selected reference point is received. The first user input may be received via the user interface 104 of the apparatus 100.

In some embodiments, a visual representation of the hairstyle mapped by the plurality of reference points acquired at block 202 may be output at the user interface 104, and a user may adjust at least one of the relative position and the hair length value of a selected reference point by manipulating the visual representation of the hairstyle via the user interface 104. For example, a user may adjust, via the user interface 104, the hair length at the top portion of the head of the subject by dragging the top portion of the hairstyle away from the head of the subject. In this example, the selected reference point would be the reference point which corresponds to the top portion of the head of the subject. As another example, the user may move, via the user interface 104, a portion of the hairstyle where the hair length is the longest from one location to another location with respect to the hairstyle.

In some embodiments, more than one reference points may correspond to a specific portion of the head of the subject. The selection of the reference point(s) and how the selected reference point(s) are adjusted (in terms of relative position and/or hair length value) may be automatically determined based on a manipulation of the visual representation of the hairstyle or based on other forms of input by the user via the user interface 104 of the apparatus 100.

Returning back to FIG. 2, at block 206, at least one of the relative position and the hair length value of one or more non-selected reference points is adjusted. More specifically, the adjustment of at least one of the relative position and the hair length value of one or more non-selected reference points may be performed at the processor 102 of the apparatus 100. The adjustment of the at least one of the relative position and the hair length value of one or more non-selected reference points is based on the first user input received at block 204 and one or more predetermined rules.

The one or more predetermined rules may define a value or a range of values associated with at least one of a gradient of hair length at a portion of the head of the subject. Alternatively or in addition, the one or more predetermined rules may be to perform (linear or non-linear) interpolation or extrapolation of at least one of the plurality of reference points (including those adjusted at block 204).

As mentioned above with reference to block 202, in some embodiments the one or more predetermine rules may be associated with an initial hairstyle guide. For example, an initial hairstyle guide acquired at block 202 may correspond to a "flattop" hairstyle. In this example, a predetermined rule associated with the initial hairstyle guide (to achieve the "flattop" effect) may be: the hair length values of all the reference points that are associated with a relative position located at the top of the head of the subject must be constant or within a small numerical range. Therefore, if at block 204 the first user input corresponds to adjusting at least one of the relative position and the hair length value of a selected reference point that is associated with the top of the head of the subject, e.g. changing the hair length value at a part of the top of the head from 3 mm to 5 mm, the hair length values of the rest of the reference points that is associated with the top of the head of the subject are also adjusted to 5 mm according to the specific predetermined rule associated with the initial hairstyle guide. It will be appreciated that in most cases, the one or more predetermined rules associated with the initial hairstyle guide ensure that an overall shape or a similar overall shape of the corresponding hairstyle can be maintained. In some cases, the one or more predetermined rules may be used to prevent too much variation of hair length values in a local area of the corresponding hairstyle.

In some embodiments, the adjustment of at least one of the relative position and the hair length value of one or more non-selected reference points at block 206 may comprise adjusting at least one of the relative position and the hair length value of one or more non-selected reference points that are within a predetermined distance (e.g. 15 mm) from the selected reference point.

As mentioned above, in some embodiments each of the plurality of reference points acquired at block 202 may be associated with one of a plurality of longitudinal sections of the head of the subject. In these embodiments, the adjustment of at least one of the relative position and the hair length value of one or more non-selected reference points at block 206 may comprise adjusting the relative position and the hair length value of one or more non-selected reference points that are associated with the same longitudinal section as the selected reference point. An example of this embodiment is provided with reference to FIG. 4, which illustrates a plurality of reference points and their associated longitudinal sections as visualized on the head of a subject.

Returning back to FIG. 2, at block 208, an optimized hairstyle guide for mapping the hairstyle is generated. More specifically, an optimized hairstyle guide may be generated by the processor 102 of the apparatus 100. The optimized hairstyle guide comprises the adjusted reference pints resulting from block 206. In some embodiments, the optimized hairstyle guide may further comprise one or more non-adjusted reference points. The generated optimized hairstyle guide may be stored at one or more databases in a memory 106, which may be a memory of the apparatus 100 or a memory external to the apparatus 100.

In some embodiments, the computer-implemented method may further comprise controlling a display to output a visual representation of the hairstyle mapped by the generated optimized hairstyle guide. The display may be a component of the user interface 104 of the apparatus 100.

As mentioned above, in some embodiments an initial hairstyle guide comprising a plurality of principal reference points may be acquired at block 202. In these embodiments, although not illustrated in FIG. 2, the computer-implemented method may further comprise receiving a second user input to adjust least one of the relative position and the hair length value of one of the plurality of principal reference points, and adjusting, based on the second user input, at least one of the relative position and the hair length value of one or more of the plurality of reference points. The second user input may be received via the user interface 104 of the apparatus 100. In some embodiments, a visual representation of the plurality of principal reference points may be output at the user interface 104, and a user may adjust at least one of the relative position and the hair length value of one of the plurality of principal reference points by manipulating the visual representation of the respective principal reference point (e.g. dragging it to a different position) via the user interface 104.

Although not illustrated in FIG. 2, in some embodiments the computer-implemented method may further comprise detecting a relative position of the hair clipper to the head of the subject. This step may be performed by the processor 102 of the apparatus 100 based on existing positioning techniques. In these embodiments, the computer-implemented method may further comprise determining one or more reference points that are adjacent to the detected relative position of the hair clipper, calculating, for each of the determined one or more adjacent reference points, the distance between the relative position of the hair clipper and the adjacent reference point, and determining a length setting for the hair clipper based on the calculated distance between the relative position of the hair clipper and each of the one or more adjacent reference points.

In these embodiments, the determination of one or more reference points that are adjacent to the detected relative position of the hair clipper may comprise determining one or more reference points that are within a predetermined distance from the detected relative position of the hair clipper. Alternatively or in addition, the determination of one or more reference points that are adjacent to the detected relative position of the hair clipper may comprise determining a predetermined number of reference points that are closest to the detected relative position of the hair clipper. For example, in some embodiments, the five reference points that are closest to the detected relative position of the hair clipper may be determined as the adjacent reference points to be used in any subsequent steps.

In these embodiments, the determination of the length setting for the hair clipper may be based on interpolation of the calculated distance between the relative position of the hair clipper and each of the one or more adjacent reference points.

Furthermore, in these embodiments, three-dimensional (3D) positioning and/or orientation based on alternating current (AC) magnetic fields may be used for detecting the relative position of the hair clipper to the head of the subject. The determination of the length setting for the hair clipper may be based on interpolation of the calculated distance between the relative position of the hair clipper and each of the one or more adjacent reference points.

Figure 3:
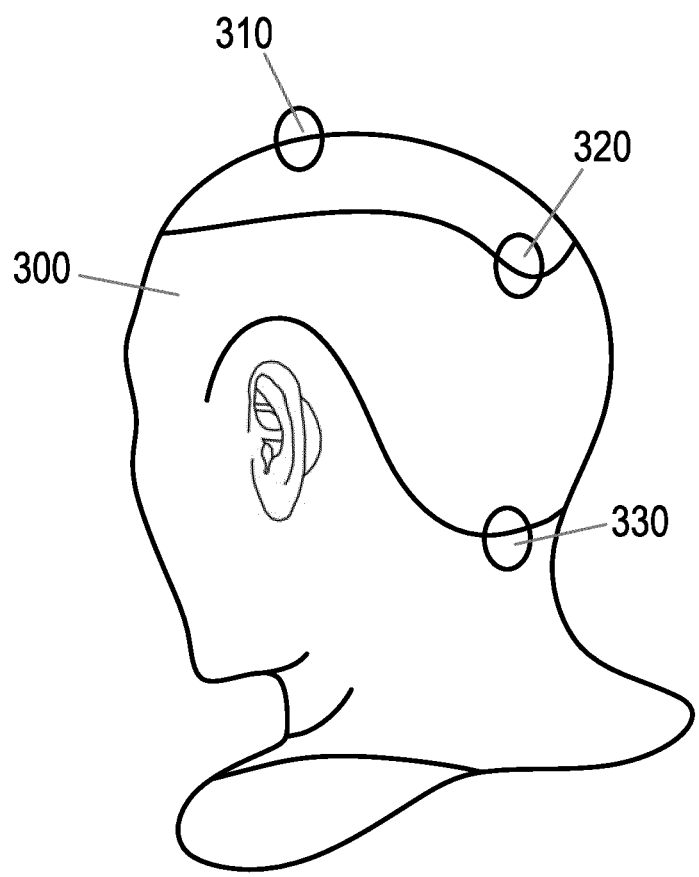
FIG. 3 illustrates a plurality of principal reference points of an initial hairstyle guide, as visualized on the head of a subject, according to an embodiment.

FIG. 3 illustrates a plurality of principal reference points of an initial hairstyle guide, as visualized on the head of a subject, according to an embodiment. This exemplary visualization may be rendered (or displayed or output) at the user interface 104 of the apparatus 100 as described with reference to FIG. 1. In some embodiments, the plurality of principal reference points may be visualized based on average dimensions of a human head.

As illustrated in FIG. 3, in the present embodiment three different principal reference points 310, 320, 330 are presented visually with respect to the head 300 of the subject. The first principal reference point 310 corresponds to the top portion of the head of the subject, the second principal reference point 320 corresponds to the crown portion of the head of the subject, and the third principal reference point 330 correspond to the neck portion of the head of the subject. In some embodiments, the first, second, and third principal reference points may be displayed at the user interface 104, so as to provide users with an intuitive way to manipulate at least one of the respective position and the hair length value of a principal reference point. Based on this user input at the user interface 104, the processor 102 of the apparatus 100 may be configured to adjust at least one of the relative position and the hair length value of one or more of the plurality of reference points.

Figure 4:
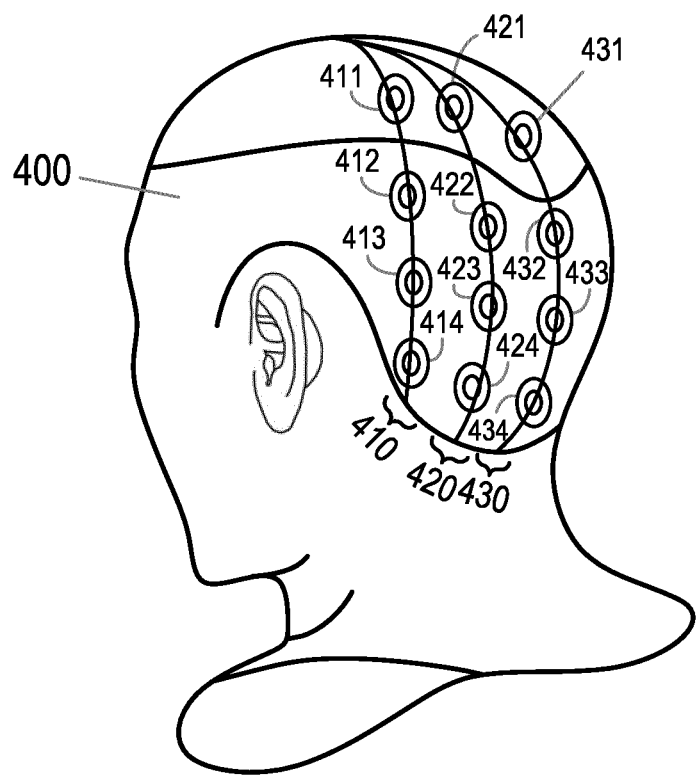
FIG. 4 illustrates a plurality of reference points and their associated longitudinal sections as visualized on the head of a subject, according to an embodiment.

FIG. 4 illustrates a plurality of reference points and their associated longitudinal sections as visualized on the head of a subject, according to an embodiment. Although FIG. 4 provides a visualized representation of the plurality of reference points and a plurality of sections of the head 400 of the subject, this visualized representation may not necessarily be displayed to a user (via the user interface 104 of the apparatus 100 or otherwise) so as to avoid overwhelming users of the apparatus 100 with excessive visual information. Nevertheless, in some embodiments, this exemplary visualization may be rendered (or displayed or output) at the user interface 104 of the apparatus as described with reference to FIG. 1.

As illustrated in FIG. 4, in the present embodiment a plurality of reference points may be arranged in a grid pattern. The plurality of reference points comprises a first set, a second set, and a third set, and each of these sets of reference points is associated with a longitudinal section of the head of the subject. In this example, each of the plurality of sets of reference points is associated with one of: a first longitudinal section 410, a second longitudinal section 420, and a third longitudinal section 430.

In more detail, the first set comprises reference points 411, 412, 413, and 414 which are all associated with the first longitudinal section 410 of the head of the subject. The second set comprises reference points 421, 422, 423, and 424 which are all associated with the second longitudinal section 420 of the head of the subject. The third set comprises reference points 431, 432, 433, 434 which are all associated with the third longitudinal section of the head of the subject. One or more of these reference points may be formerly a principal reference point of an initial hairstyle guide.

Although it is described above that each of the plurality of reference points is associated with one of three longitudinal sections of the head of the subject, it will be appreciated that in alternative embodiments, a different number of longitudinal sections of the head of the subject may be used, depending on a desired resolution of a mapped hairstyle. Also, although it is described above that each of the plurality of reference points is associated with one of a plurality of longitudinal sections of the head of the subject, in an alternative embodiment, the plurality of sections may not necessarily be longitudinal with respect to the head of the subject.

There is thus provided an improved method and apparatus for generating an optimized hairstyle guide for use with a hair clipper, which overcomes the existing problems.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for generating an optimized hairstyle guide for use with a hair clipper, the method comprising:
   acquiring a plurality of reference points for mapping a hairstyle onto a head of a subject, wherein each of the plurality of reference points is associated with a respective position relative to the head of the subject and a hair length value;
   receiving a first user input for adjusting at least one of the relative position and the hair length value of a selected reference point;
   adjusting, based on the first user input and one or more predetermined rules, at least one of the relative position and the hair length value of one or more non-selected reference points;
   generating the optimized hairstyle guide for mapping the hairstyle, wherein the optimized hairstyle guide comprises the adjusted reference points; and
   providing a digital user interface configured to enable a user to select, create, and transfer a desired hairstyle to the hair clipper, and cause the hair clipper to perform necessary maneuvers to achieve the desired hairstyle, wherein: the digital user interface provides an output of the generated optimized hairstyle guide in a visual representation format at a display; the visual representation format comprises the reference points; and the hair clipper is adapted to provide orientation and measurement functionalities.

2. The computer-implemented method according to claim 1, wherein the one or more predetermined rules define a value or a range of values associated with at least one of a gradient of hair length at a portion of the head of the subject.

3. The computer-implemented method according to claim 1, wherein acquiring the plurality of reference points comprises:
   acquiring an initial hairstyle guide for mapping the hairstyle, the initial hairstyle guide comprising a plurality of principal reference points, wherein each of the plurality of principal reference points is associated with a respective principal position relative to the head of the subject and a hair length value; and
   generating the plurality of reference points based on at least one of the plurality of principal reference points.

4. The computer-implemented method according to claim 3, wherein the one or more predetermined rules are associated with the initial hairstyle guide.

5. The computer-implemented method according to claim 3, wherein the plurality of principal reference points is associated with a position relative to the head of the subject at which the hair length in the mapped hairstyle is the longest.

6. The computer-implemented method according to claim 3, wherein each of the plurality of principal reference points is associated with one of: a top portion of the head of the subject, a crown portion of the head of the subject, and a neck portion of the head of the subject.

7. The computer-implemented method according to claim 1, wherein adjusting at least one of the relative position and the hair length value of one or more non-selected reference points comprises:
adjusting at least one of the relative position and the hair length value of one or more non-selected reference points that are within a predetermined distance from the selected reference point.

8. The computer-implemented method according to claim 3, further comprising:
receiving a second user input to adjust at least one of the relative position and the hair length value of one of the plurality of principal reference points; and
adjusting, based on the second user input, at least one of the relative position and the hair length value of one or more of the plurality of reference points.

9. The computer-implemented method according to a claim 1, wherein the generated optimized hairstyle guide further comprises one or more non-adjusted reference points.

10. The computer-implemented method according to claim 1, wherein each of the plurality of reference points is associated with one of a plurality of longitudinal sections of the head of the subject, and wherein for each of the plurality of reference points, the relative position is defined with respect to a neck of the subject and with respect to its associated longitudinal section.

11. The computer-implemented method according to claim 10, wherein adjusting at least one of the relative position and the hair length value of one or more non-selected reference points comprises:
adjusting at least one of the relative position and the hair length value of one or more non-selected reference points that are associated with the same longitudinal section as the selected reference point.

12. The computer-implemented method according to claim 1, further comprising controlling a display to output a visual representation of the hairstyle mapped by the generated optimized hairstyle guide.

13. The computer-implemented method according to claim 1, further comprising:
detecting a relative position of the hair clipper to the hair of the subject;
determining one or more reference points that are adjacent to the detected relative position of the hair clipper;
calculating, for each of the determined one or more adjacent reference points, a distance between the relative position of the hair clipper and the adjacent reference point; and
determining a length setting for the hair clipper based on the calculated distance between the relative position of the hair clipper and each of the one or more adjacent reference points.

14. A computer program product comprising a computer readable medium, the computer readable medium having computer readable code embodied therein, the computer readable code being configured such that, on execution by a suitable computer or processor, the computer or processor is caused to perform the method as claimed in claim 1.

15. An apparatus for generating an optimized hairstyle guide for use with a hair clipper, the apparatus comprising:
the hair clipper, adapted to provide orientation and measurement functionalities;
a processor;
a memory that stores instructions, which when executed by the processor, causes the processor to: acquire a plurality of reference points for mapping a hairstyle onto a head of a subject, wherein each of the plurality of reference points is associated with a respective position relative to the head of the subject and a hair length value; receive a first user input for adjusting at least one of the relative position and the hair length value of a selected reference point; adjust, based on the first user input, the relative position and the hair length value of one or more non-selected reference points; generate, based on one or more predetermined rules, the optimized hairstyle guide for mapping the hairstyle, wherein the optimized hairstyle guide comprises the adjusted reference points; and
a digital user interface, which enables a user to select, create, and transfer a desired hairstyle to the hair clipper, wherein: the digital user interface generates an output comprising the optimized hairstyle guide in a visual representation format at a display and provides instructions, which when executed by the processor, further cause the hair clipper to perform necessary maneuvers to achieve the desired hairstyle; the visual representation format comprises a reference point; and the plurality of reference points and their associated longitudinal sections are provided on the user interface for a visualization.

16. The apparatus according to claim 15, wherein the one or more predetermined rules define a value or a range of values associated with at least one of a gradient of hair length at a portion of the head of the subject.

17. The apparatus according to claim 15, wherein when acquiring the plurality of reference points, the instructions further cause the processor to:
acquire an initial hairstyle guide for mapping the hairstyle, the initial hairstyle guide comprising a plurality of principal reference points, wherein each of the plurality of principal reference points is associated with a respective principal position relative to the head of the subject and a hair length value; and
generate the plurality of reference points based on at least one of the plurality of principal reference points.

18. The apparatus according to claim 17, wherein the one or more predetermined rules are associated with the initial hairstyle guide.

19. The apparatus according to claim 17, wherein the plurality of principal reference points is associated with a position relative to the head of the subject at which the hair length in the mapped hairstyle is the longest.

20. The apparatus according to claim 17, wherein each of the plurality of principal reference points is associated with one of: a top portion of the head of the subject, a crown portion of the head of the subject, and a neck portion of the head of the subject.

* * * * *